(12) United States Patent
Geli et al.

(10) Patent No.: US 11,053,363 B2
(45) Date of Patent: Jul. 6, 2021

(54) CARBON FIBER RANDOM MAT AND CARBON FIBER COMPOSITE MATERIAL

(71) Applicant: TORAY INDUSTRIES, INC., Tokyo (JP)

(72) Inventors: Maurice Geli, Lescar (FR); Yann Buzare, Gelos (FR); Takuya Karaki, Ehime (JP); Ichiro Taketa, Pau (FR)

(73) Assignee: Toray Industries, Inc., Tokyo (JP)

( * ) Notice: Subject to any disclaimer, the term of this patent is extended or adjusted under 35 U.S.C. 154(b) by 112 days.

(21) Appl. No.: 16/307,323

(22) PCT Filed: Jul. 12, 2017

(86) PCT No.: PCT/EP2017/067528
§ 371 (c)(1),
(2) Date: Dec. 5, 2018

(87) PCT Pub. No.: WO2018/011260
PCT Pub. Date: Jan. 18, 2018

(65) Prior Publication Data
US 2019/0256673 A1    Aug. 22, 2019

(30) Foreign Application Priority Data

Jul. 15, 2016   (EP) ..................................... 16305921

(51) Int. Cl.
*C08J 5/04*         (2006.01)
*D04H 1/4218*    (2012.01)
(Continued)

(52) U.S. Cl.
CPC ............... *C08J 5/042* (2013.01); *C08J 5/043* (2013.01); *C08J 5/046* (2013.01); *D04H 1/4209* (2013.01);
(Continued)

(58) Field of Classification Search
CPC .... Y10T 428/268; D21H 13/50; D21H 17/55; D06M 2101/40; B29C 70/12; C08J 5/042;
(Continued)

(56) References Cited

U.S. PATENT DOCUMENTS

2015/0203663 A1*  7/2015  Sonoda ................ D04H 1/4342
                                                                524/495
2015/0292145 A1   10/2015  Sonoda et al.

FOREIGN PATENT DOCUMENTS

EP       2810979 A1   12/2014
EP       2871202 A1    5/2015
(Continued)

*Primary Examiner* — Camie S Thompson
(74) *Attorney, Agent, or Firm* — DLA Piper LLP (US)

(57) ABSTRACT

A random mat material including fiber bundles, said fiber bundles including fibers having an average fiber length of 5 to 100 mm, and having an average number N of fibers in the fiber bundle that satisfies:

$$\frac{1.5 \times 10^5}{D^2} < N < \frac{4.5 \times 10^5}{D^2}$$

wherein D is the average diameter of fibers in the fiber bundle, expressed in micrometers, and the standard deviation $SD_N$ of the number of fibers in a fiber bundle satisfies:

$$1{,}000 < SD_N < 6{,}000$$

wherein at an end of the fiber bundle, the number of the fibers in a fiber bundle becomes less from center to edge of the fiber bundle in a fiber direction.

10 Claims, 3 Drawing Sheets

(51) Int. Cl.
*D04H 1/4242* (2012.01)
*D04H 1/4342* (2012.01)
*D04H 1/4209* (2012.01)

(52) U.S. Cl.
CPC ......... *D04H 1/4218* (2013.01); *D04H 1/4242* (2013.01); *D04H 1/4342* (2013.01); *C08J 2300/22* (2013.01); *C08J 2300/24* (2013.01); *C08J 2323/06* (2013.01); *C08J 2323/12* (2013.01); *C08J 2377/02* (2013.01); *C08J 2377/06* (2013.01)

(58) Field of Classification Search
CPC ........ C08J 2300/22; C08J 5/043; C08J 5/046; D04H 1/4242; D04H 1/72; D04H 1/4218; D04H 1/4209; D04H 1/724218
USPC ..................... 442/59, 50, 60; 428/338, 297.4
See application file for complete search history.

(56) References Cited

FOREIGN PATENT DOCUMENTS

| | | |
|---|---|---|
| JP | 2009-062648 A | 3/2009 |
| WO | 2014/156760 A1 | 2/2014 |

\* cited by examiner

CARBON FIBER RANDOM MAT AND CARBON FIBER COMPOSITE MATERIAL

TECHNICAL FIELD

This disclosure relates to a random mat material and its production method and specifically, to a carbon fiber random mat and carbon fiber composite material made of the mat and having high mechanical properties. The disclosure also relates to a process of producing such carbon fiber random mat without complex steps.

BACKGROUND

Carbon fiber composite materials comprising carbon fibers are used for the manufacture of various molded articles and various technologies. Such materials present high mechanical properties and enable manufacturing molded article with high mechanical properties. Random mat consisting of fiber bundles have been widely used to manufacture carbon fiber composites. Such carbon fiber composites have good mechanical properties and formability. To manufacture such a random mat, a fiber tow having a very narrow bundle size such as 1K and 3K tows were used. However, such a fiber tow tends to be costly. Recently, wider fiber tows have been developed and are now widely used. For a random mat usage, 12K fiber tow have been tried to be used, but wider fiber bundle decreases mechanical properties and cannot be used without specific production technologies. For example, WO2014156760 relates to a carbon fiber nonwoven fabric comprising carbon fibers wherein the proportion, relative to the whole amount of fibers, of specified carbon fiber bundles in a carbon fiber composite material is low, and the average number of fibers in the respective specified carbon fiber bundles is controlled in a specified range. The proportion of carbon fiber bundles relative to the total weight of carbon fibers is 5 to 80 wt. %. If the proportion of the carbon fiber bundles is more than 80 wt. %, the mechanical properties and followability of carbon fibers to small parts deteriorate, and variability in mechanical properties becomes great. The average number of fibers in the respective specified carbon fiber bundles is 90 to 1,000 fibers per bundle. The standard deviation σ of the number of carbon fibers forming the carbon fiber bundle is 50 to 500. However, in such a carbon fiber composite material as described in WO2014156760, wherein the carbon fiber bundles in the carbon fiber composite material are thin, the proportion of the bundles is low and the carbon fibers are refined. Although the mechanical properties of a molded article manufactured using the same are excellent, the process to produce it needs highly complex machinery equipment and, therefore, the cost to produce such a carbon fiber composites increases even more as the carbon fiber itself is expensive.

JP 2009-062648A relates to a composite material wherein the proportion of specified carbon fiber bundles in a carbon fiber composite material relative to the whole amount of fibers, is similar to that described above, that is set high, and the average number of fibers in the respective specified carbon fiber bundles is controlled in another specified range. In addition, the angle of the edge of the carbon fiber bundle is defined so that the stress concentration does not occur at the edge of carbon fiber bundles and mechanical properties of the carbon fiber composite do not decrease. However, in such a carbon fiber composite material as described in JP 2009-062648A wherein the carbon fiber bundles are thick and the angle of the edge of the bundles is controlled, the cost of producing it becomes high and it is difficult for the carbon fiber composite to be used widely in the industry.

Accordingly, there is a need to provide carbon fiber composite materials having good mechanical properties and that could be produced by conventional machinery equipment to save production costs.

More particularly, there is a need to provide a random mat material which may be manufactured at low costs with, wider fiber tows such as, for example, more than 3K, preferably at least 12K.

SUMMARY

We thus provide a random mat material comprising fiber bundles, the fiber bundles comprising fibers having an average fiber length of 5 to 100 mm, at the end of the fiber bundle the number of fibers in a fiber bundle becomes less from center to edge of the fiber bundle in the fiber direction, and having an average number N of fibers in the fiber bundle that satisfies formula:

$$\frac{1 \times 10^5}{D^2} < N < \frac{3 \times 10^5}{D^2}$$

D is the average diameter of fibers in the fiber bundle, expressed in micrometers (μm).

Within this range, a random mat made of these fiber bundles can produce a carbon fiber composite which has good mechanical properties. "Fiber" is a term well known in the art and means in particular that fibers present in the composite material provide higher mechanical properties than without fibers, and more specifically at least higher flexural modulus and/or higher flexural strength. "Fibers" refers to "fibers" unless expressed otherwise.

From the mechanical properties point of view, it is preferred that N is less than $3.5 \times 10^5/D^2$. N may satisfy the formula: 1,200<N<20,000, and preferably satisfies the formula: 1,500<N<10,000. In one preferred embodiment, N satisfies foimula: 2,000<N<10,000, and preferably satisfies the formula: 3,000<N<6,000.

The fibers may be carbon fibers. The carbon fibers are preferably used as fiber bundles and the average number of fiber in the fiber bundles is determined by the formula described below.

$$\frac{1 \times 10^5}{D^2} < N < \frac{3 \times 10^5}{D^2}$$

D: average diameter of carbon fibers in the fiber bundle (micrometers; μm).

The fibers are not particularly restricted. Preferably, fibers comprise or consist of carbon fibers, glass fibers, aramid fibers, and any mixture thereof. High-strength and high-elastic modulus carbon fibers are more preferably used. Typically, fibers are man-made fibers.

One kind of carbon fibers may be used.

Two or more kinds of carbon fibers may be used together.

In particular, PAN-base, pitch-base, rayon-base, carbon fibers or any mixture thereof can be exemplified among commonly used carbon fibers. From the viewpoint of the balance between the strength and the elastic modulus of a molded article to be obtained, PAN-base carbon fibers are preferred.

Very often, the carbon fibers which constitute the carbon fiber bundle have a sizing agent to bundle the carbon fibers.

Preferably, the density of carbon fibers is 1.65 to 1.95 g/cm$^3$, and more preferably 1.70 to 1.85 g/cm$^3$. If the density is too high, the lightness in weight of the resulting composite material comprising the fibers, for example, a carbon fiber-reinforced plastic is poor and, if too low, the mechanical properties of the composite material may become low.

High mechanical performance can be obtained without any high performance machinery and equipment, which leads to keep production costs low.

The fiber bundle may have beveled ends.

The variation of number of fibers in the fiber bundle is not limited to a certain range. The standard deviation $SD_N$ of the number of fibers in a fiber bundle may satisfy the formula:

$$1,000 < SD_N < 6,000$$

Such standard deviation $SD_N$ of the number of fibers in a bundle gives high mechanical properties. Also, the production costs are low.

$SD_N$ may satisfy the formula: $2,000 < SD_N < 6,000$, and preferably $3,000 < SD_N < 6,000$.

Typically, the diameter of a fiber and in particular of carbon fibers is 1 to 30 micrometers, and more usually 5 to 10 micrometers.

To get the high mechanical properties and low cost production, it is preferred that the kind of the fibers is at least one selected from the group consisting of a carbon fiber, a glass fiber, an aramid fiber, and any mixture thereof.

We also provide carbon fiber bundles.

Typically, the fibers form reinforcing fibers. Typically, the fiber bundles form reinforcing fiber bundles.

We also provide a method or process of preparing random mat, the method or process comprising the following steps:
(i) cutting a fiber bundle at essentially constant intervals, wherein the cutting edge has a diagonal angle θ with respect to the fiber direction; and
(ii) reducing the size of the fiber bundle, thereby providing a random mat.

A continuous fiber bundle is used to continuously feed the fiber bundle in step (i). Typically, such continuous fiber bundles are sold as fiber tow.

Continuous carbon fiber bundles may be cut at step (i).

Preferably, 12K carbon fiber bundles are cut at step (i). It is usually referred to 12K carbon fiber tows.

Preferably, 24K carbon fiber bundles are cut at step (i). It is usually referred to 24K carbon fiber tows.

The cutting step (i) involves one or more cutting rolls.

The rotating speed of cutting roll can be selected without any limitation as long as it can provide the fiber bundles. However, to manufacture composite materials having high mechanical properties at low production costs with an industrial manufacturing process, it is preferred that the cutting step (i) is performed by a cutting roll, typically a helicoidally shaped knife, having a rotational speed is vc, wherein $$100 \text{ RPM} < vc < 400 \text{ RPM}$$

In the range of vc, the fiber bundle can be controlled in a desirable range in a stable process.

Because the fiber bundles are cut, it is also referred to "chopped fiber bundles" or "cut fiber bundles".

At the step of cutting a continuous fiber bundle at constant intervals, the diagonal angle θ of the cutting edge is preferably selected between 15 and 85 degree (15°<θ<85°). Such cutting step allows forming fiber bundles with beveled ends.

Within this preferred range of diagonal angle θ, the fiber can be obtained in the range bundle. Further, if the diagonal angle θ is 30° to 60°, fiber bundles are more easily obtained so that the fiber bundles shaped as the number of fibers in a fiber bundle becomes less from center to edge (or ends) of the fiber bundle in the fiber direction. This configuration can reduce the stress concentration at the edge (or end or extremity) of the fiber bundle, thereby enhancing strength of the composite made of these fiber bundles.

The cutting tools can be selected without any limitation, but nomial cutting roll with angled blade, typically made of steel, can be preferably used.

Step (ii) of reducing the size of the fiber bundle preferably comprises separating a fiber bundle into multiple fiber bundles wherein the multiple fiber bundles have a width less than the width of the original fiber bundle. The cut or chopped fiber bundle or fiber tow is separated into multiple fiber bundles forming elements or segments made of parts of the fiber bundle or fiber tow.

Step (ii) of reducing the size of the fiber bundle preferably comprises separating a fiber bundle into multiple fiber bundles wherein the multiple fiber bundles have less fibers than the original fiber bundle. In one example, the number of fibers is divided by at least 1.5 in the cut or chopped fiber bundles compared to the original fiber bundle or fiber tow.

The number of fibers may be divided by at least 2 in the cut or chopped fiber bundles compared to the original fiber bundle or fiber tow.

The number of fibers may be divided by at least 2.5 in the cut or chopped fiber bundles compared to the original fiber bundle or fiber tow.

Advantageously, by reducing the size of the fiber bundle, the cut or chopped fibers meet the technical characteristics.

Preferably, step (ii) of reducing the size of the fiber bundle involves one or more stretching rolls. The stretching roll advantageously stretches the fibers that are cut or being cut to separate the fiber bundle into multiple fiber bundles wherein the multiple fiber bundles have a width less than the width of the original fiber bundle. The distance L between cutting roll and stretching roll can be selected without any limitation as long as it can lead to the fiber bundle. L is the distance separating the cutting tools on the cutting roll 3 and the stretching roll 2 thereby defining the length of the fiber bundles that are cut. To manufacture composite material having high mechanical properties at low production costs with an industrial manufacturing process, it is preferred that the size of the fiber bundles is reduced by a stretching roll that is placed at a distance L of 5 to 100 mm from the cutting roll, the stretching roll rotating at a rotational speed vr; wherein $$3000 \text{ RPM} < vr < 15000 \text{ RPM}$$

The distance L between the stretching rolls and cutting roll may be:

$$20 \text{ mm} < L < 55 \text{ mm}$$

Preferably, the process is advantageously very stable and provides the chopped fiber bundles.

The step of reducing the size of the fiber bundle can be performed without any limitation, but it is preferred to use stretching rolls for drawing the cut fiber elements to use common machine and equipment. This enables lowering the production costs.

The shape of the rolls in the method or process can be selected without any limitation as long as it can obtain the fiber bundle. However, to manufacture composite materials having high mechanical properties at low production costs with an industrial manufacturing process, it is preferred that the roll(s) has(have) a cylindrical or conical shape.

The ratio between speed of cutting roll ye and the speed of stretching roll vr can be selected without any limitation as long as it can lead to the fiber bundle. To manufacture composite material having high mechanical properties at low production costs with an industrial manufacturing process, it is preferred that vr is larger than vc. Preferably, that the ratio of vr/vc satisfies the formula:

$$20<vr/vc<80$$

When vr is larger than vc, and in particular when vr/vc is within the above specified range, the process is advantageously very stable and provides fiber bundles.

Advantageously, such vr/vc ratio enables to separate a fiber bundle into multiple fiber bundles.

The fiber bundles obtained at step (ii) typically form a random mat of fiber bundle.

To manufacture composite material having high mechanical properties at low production costs with an industrial manufacturing process, it is preferred that the fibers form a reinforcing layer for a composite material.

We also provide a random mat of fiber bundle comprising fibers or as obtainable according to the method or process. The random mat may comprise a thermoset or a thermoplastic matrix and fiber bundles. Typically after step (ii) the method or process comprises depositing a random mat of fiber bundles onto a thermoset or a thermoplastic matrix. Then, the thermoset or a thermoplastic matrix is typically cured to provide a cured thermoset or a thermoplastic matrix comprising a random mat of fiber bundles.

We also provide a composite material comprising one or more random mats as defined or as obtainable according to the method or process. The composite material may comprise a thermoset or a thermoplastic matrix. The composite material may comprise one or more layers of random mat of fiber bundles or as obtainable according to the method or process.

A thermoset or a thermoplastic resin may be a matrix resin. The thermoplastic matrix resin is not particularly restricted, and it can be appropriately selected within a range that does not greatly reduce the mechanical properties of the fiber reinforced composite material. For example, theimoplastic matrix resin is selected from the group consisting of a polyolefin-group resin such as, for example, polyethylene or polypropylene, a polyamide-group resin such as, for example, nylon 6 or nylon 6,6, a polyester group resin such as polyethylene terephthalate or polybutylene terephthalate, a resin such as, for example, a polyetherketone, a polyethersulfone, an aromatic polyamide, and any mixture thereof, can be used. For example, it is preferred that the thermoplastic matrix resin is at least one selected from the group consisting of polyamide, polyphenylene sulfide, polypropylene, polyetheretherketone, a phenoxy resin, and any mixture thereof. For example, epoxy, unsaturated polyester, vinyl ester, phenol, epoxy acrylate, urethane, can be used as thermoplastic matrix resin. More preferably, epoxy, unsaturated polyester, vinyl ester, acryl, and any mixture thereof that can provide a viscosity less than $1\times10^6$ Pa·s are preferable from tackiness and drapability viewpoint (tack and drape qualities). Tack refers to the ability of a prepreg to adhere to itself or to other material surfaces. Drape refers to the ease of handling and conforming prepregs to complex surfaces. For example, drape is the measure of the formability of prepregs around contours such as a small-radius rod. The drapability should be good enough to allow the prepregs to be formed into complex shapes.

To manufacture composite material having high mechanical properties at low production costs with an industrial manufacturing process, it is preferred that the composite material or random mat comprises a film layer. The film layer is advantageously coated with a thermoset or thermoplastic polymer film or powder.

To manufacture composite material having high mechanical properties at low production costs with an industrial manufacturing process, it is preferred that composite material comprises a mass fraction of the fiber-reinforced material between 10-65%, with respect to the total mass of the composite material.

Flexural strength of the composite comprising the fibers (ISO-14125:1998) may be at least 25 GPa, preferably of at least 28 GPa, and more preferably of at least 30 GPa.

Flexural modulus of the composite comprising the fibers (ISO-14125:1998) may be at least 210 MPa, preferably of at least 240 MPa, and more preferably of at least 250 MPa.

Thus, a random mat can be provided a carbon fiber composite material which can combine high mechanical performance and can be produces at low cost.

The carbon fiber composite material can be used to manufacture carbon fiber reinforced molded articles with combination of high mechanical properties and low production costs. Such carbon fiber composite have not been achieved by the conventional technologies.

Accordingly, we also provide a fiber-reinforced article comprising one or more random mats or composite materials.

The fiber-reinforced article may comprise 10 to 65%, for example, from 40 to 60%, by mass of the fiber bundle with respect to the total mass of the fiber-reinforced article.

Typically, the fiber-reinforced article is obtained by molding the random mat or composite. Thus, we provide such a molded fiber-reinforced article.

More preferably, the molded fiber-reinforced article is a fiber-reinforced thermosetting moulding compound such as, for example, a sheet moulding compound (SMC).

BRIEF DESCRIPTION OF THE DRAWINGS

FIGS. 5, 6 and 7 show that at fiber bundle ends the number of the fibers in the fiber bundle becomes less from center to edge of the fiber bundle in the fiber direction. In FIG. 5, the fiber bundle has beveled ends. Beveled ends are formed because of the cutting step of the process according to the invention. In FIGS. 6 and 7, fiber bundles may present different shapes at the ends because during processing random mat, the bundle with beveled ends can be deformed as schematically represented in FIGS. 6 and 7. Such shapes can be observed in the random mat material.

DETAILED DESCRIPTION

Hereinafter, our random mats, articles, and methods will be explained in detail together with Examples and Comparative Examples.

Through the method described above, the random mat can be obtained without expensive machinery and equipment. Traditional machinery and equipment can be used, comprising a: a feeder to run fiber bundle to a cutting roll, b: a cutting roll with blades embedded in a line on the roll, and c: a basket to gather the cut fiber bundles below the cutting roll.

Figure 1:
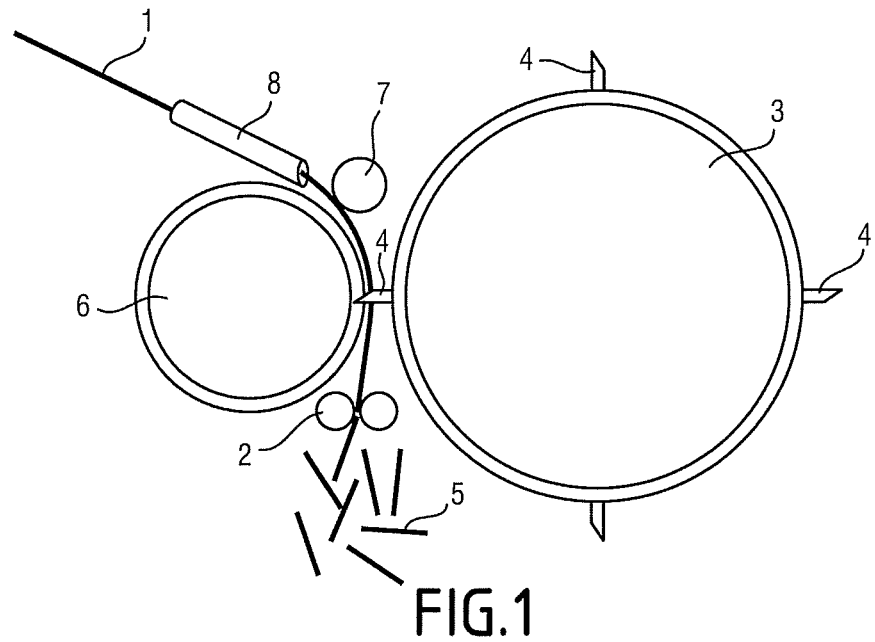
FIG. 1 is a schematic side view of an example of our process.

FIG. 1 is a schematic view an example of our process. Fiber tow 1 is fed to cutting blade 4 through guide 8, by driving roll 6 and nip roll 7, and cut into fiber bundles 5 with the cooperation of stretching rolls 2.

Figure 2:
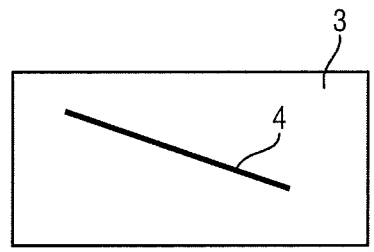
FIG. 2 is a schematic of another side view of an example of our process.

FIG. 2 is another schematic view of an example of our process showing the cutting blade 4 on the cutting roll 3. A cutting blade 4 is attached on the cutting roll 3 with a cutting edge forming an angle between the rotation direction and blade, corresponding to cut angle to fiber direction on tow.

Figure 3:
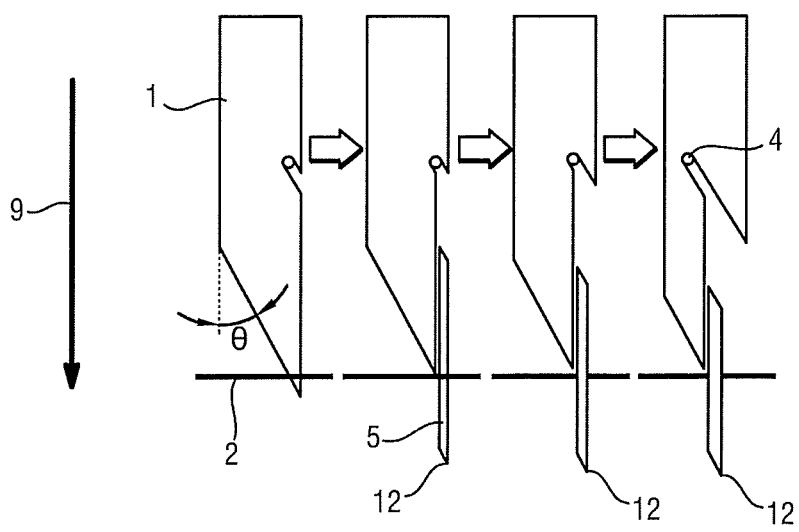
FIG. 3 is a schematic of the process with stretching rolls.

FIG. 3 is another schematic view of the process showing the fiber tow cut into fiber bundles according to an example of our process. The edge of fiber tow has an angle because the cutting blade 4 has an angle attached on the cutting roll 3. The fiber tow 1 is cut by cutting blade 4, which starts cutting fiber tow 1 at the side edge 41, and the edge 12 cut by the cutting blade is drawn by the stretching rolls and is separated from the fiber tow 1, thereby forming a fiber bundle 5. The fiber bundle or fiber tow 1 is therefore separated into multiple fiber bundles 5 forming elements or segments made of parts of the fiber bundle or fiber tow 1. Thanks to the stretching rolls 2, the number of fiber in the fiber bundles 5 is in a range defined below:

$$\frac{1 \times 10^5}{D^2} < N < \frac{4.5 \times 10^5}{D^2}$$

N: average number of fibers in the fiber bundle
D: average diameter of fibers in the fiber bundle (micrometers; μm)

Figure 4:
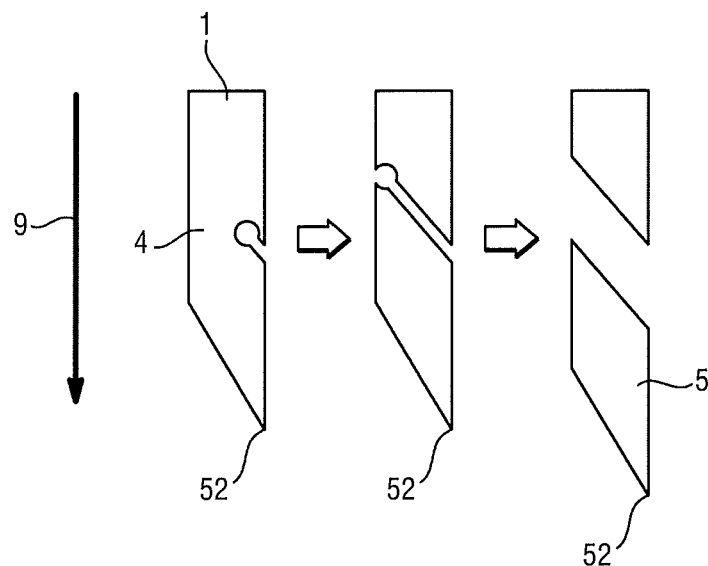
FIG. 4 is a schematic of a comparative process without stretching rolls.
Figure 5:
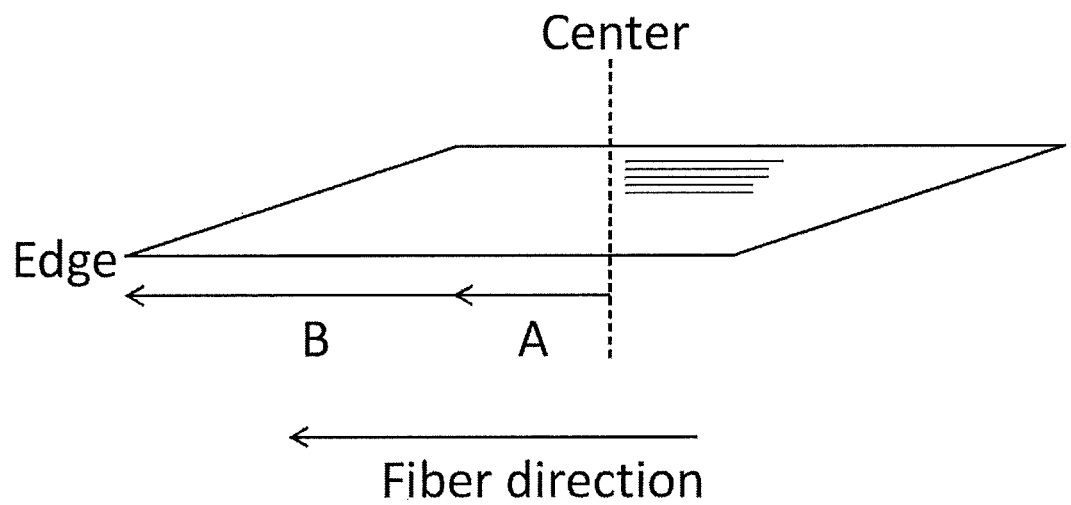
FIGS. 5, 6 and 7 are schematic side sections of examples of fiber bundles, but having different shapes at their ends.
Figure 6:
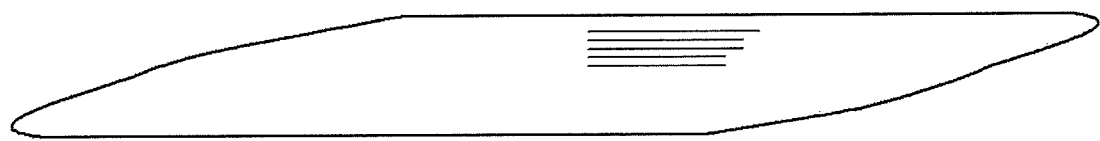
Figure 7:
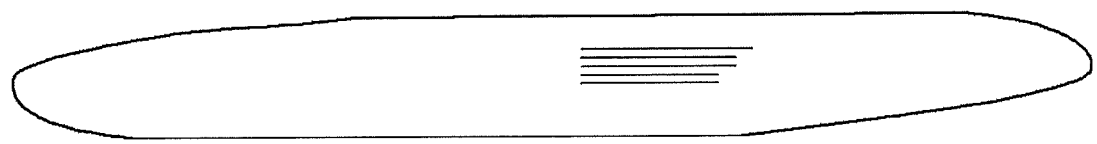

FIG. 4 is a schematic view of an example of a comparative process without stretching rolls. The edge of fiber tow 1 has a diagonal angle because the cutting blade 4 forms a diagonal angle θ on the cutting roller 3 as in FIG. 3. The fiber tow 1 is cut by cutting blade 4, which starts cutting fiber tow 1 at the side edge 41 as in FIG. 3. Such a process comprises no means of reducing the size of the fiber tow 1. More precisely without stretching rolls 2, the edge 52 cut by the cutting blade remains in place until the full width of the fiber tow 1 is cut by cutting blade 4 and forms a fiber bundle 5 wherein the number of fibers is essentially the same as that of fiber tow 1. Therefore, the number of fibers in the fiber bundle 5 is out of our range. Hence, it is not possible to obtain a random mat with high mechanical properties or low production costs.

Next, Examples and Comparative Examples are explained.

First, the properties and determination methods are explained, then Examples and Comparative Examples are detailed.

(1) Method of Determining Average Number of Fiber Bundles N and Standard Deviation SD:

A sample with a size of 10 mm×100 mm was cut out from a carbon fiber composite material and, thereafter, the sample was heated in an electric furnace heated at 500° C. for about one hour to burn off organic substances such as the matrix resin. The mass of carbon fiber aggregates left after cool down to a room temperature was determined. Carbon fiber bundles were all extracted from the carbon fiber aggregates by tweezers. All extracted carbon fiber bundles were weighted using a balance capable of measuring up to a degree of 1/10,000 g. The weight Mn and the length Ln of each carbon fiber bundle was determined. After the determination, for each bundle, $xn=Mn \times 4/D^2/\pi/Ln/S$ were calculated, wherein D is a diameter of carbon fibers, S is the specific gravity of carbon fibers, and xn is a number of fibers forming a carbon fiber bundle. 100 fiber bundles were picked up from the cut out materials and average bundle number N and standard deviation of SD were calculated from them.

Mechanical Properties (2) Flexural Modulus

Flexural modulus was determined according to ISO-14125.

(3) Flexural Strength

The flexural strength was determined according to ISO-14125.

EXAMPLES

Example 1

A commercial fiber tow was selected (T700SC-12K-50C; Toray Carbon Fibers Europe, S. A.) and was set to the creel. The fiber diameter D was of 7 micrometers (μm). The fiber tow was drawn to stretching rolls 2 via cutting rolls 3, nip roll 7, and driving roll 6 through a guide 8 (see FIG. 1). The distance between the stretching rolls 2 and cutting roll 3 was set to L=33 mm. A cutting blade 4 was set on the cutting roll 3 at a diagonal angle θ of 46 degree. Also, a resin film coated by commercial epoxy resin with 250 micrometers (μm) thickness on a releasing paper was prepared just below the stretching rolls 2 to collect cut fiber bundles 5, which would form a random mat of fibers on the film after cutting. Then the stretching rolls 2 were started rotating at vr=9778 RPM and the cutting roll 3 was started rotating at vc=275 RPM. The resin film (not shown on FIG. 1) also started to feed at a speed of 10 mm/min to obtain a random mat on resin sheet surface. The resin sheet comprising the random mat was then cut into 30 cm×30 cm square pieces and laid up to 10 layers. Then, the layers were set to a press molding machine and cured at 120 degree Celsius with 3 atmosphere pressure for 1 hour to obtain a composite material panel. Then, the panel was cut into coupon and the flexural modulus and flexural strength were evaluated in accordance with ISO 14125. The process parameters are shown in Table 1 and the results are shown in Table 2. The flexural modulus and strength are high enough to provide high mechanical properties composite materials and production costs were low thanks to the use of low cost 12K fiber tow.

The width of fiber bundles became thinner from center to edge by decreasing number of fibers. The average number N of fiber bundles and standard deviation $SD_N$ were measured in accordance with the methods descried above, and are shown in Table 2.

Examples 2 to 6

Fiber tow, rotation speed of cutting roll and stretching rolls were changed and the same evaluation as in example 1 was conducted. The process parameters and the results are shown in Table 1 and Table 2.

The flexural modulus and flexural strength were high enough because average number N of fibers in fiber bundles were within the range of the present invention, and production costs were low thanks to the use of low cost 12K and 24K fiber tow.

Comparative Examples 1 to 3

The conditions were the same as those in Example 1 except for fiber tow which was changed to T300-3K-40B and T300-1K-40B (both are commercial productions from Toray Industries, Inc.) and the evaluation was conducted as shown in Table 3. Results are shown in Table 4. The mechanical properties of the composite according to Comparative Example 1 were lower than that of Examples 1 to 6 because N was out of range. The mechanical properties of the composite according to Comparative Examples 2 and 3 were as good as Examples 1-6, but the production costs were higher than our examples because of usage of 3K and 1K fiber tows which price are higher than that of 12K or 24K.

TABLE 1

Materials and process conditions of Examples 1 to 6

| Example | Fiber | Matrix | Angle θ [°] | Cut roller speed vc [°/s] | Stretch roller speed vr [°/s] | ratio vr/vc | Distance between Cut/Stretch L [mm] |
|---|---|---|---|---|---|---|---|
| 1 | T700S-12K | epoxy | 46 | 275 RPM | 9778 RPM | 36 | 33 |
| 2 | T700S-12K | epoxy | 46 | 180 RPM | 9778 RPM | 54 | 33 |
| 3 | T700S-12K | epoxy | 46 | 180 RPM | 12222 RPM | 68 | 33 |
| 4 | T700S-12K | epoxy | 46 | 275 RPM | 7333 RPM | 27 | 33 |
| 5 | T700S-12K | epoxy | 46 | 180 RPM | 4889 RPM | 27 | 33 |
| 6 | T700S-24K | epoxy | 46 | 180 RPM | 4889 RPM | 27 | 33 |

TABLE 2

Results of Examples 1 to 6

| Example | Average N [x1000] | satisfies $\frac{1.5 \times 10^5}{D^2} < N < \frac{4.5 \times 10^5}{D^2}$ | StDev [x1000] | Flexural modulus [GPa] | StDev [GPa] | Flexural strength [MPa] | StDev [MPa] | Vf [%] | cost |
|---|---|---|---|---|---|---|---|---|---|
| 1 | 4.62 | Yes | 3.12 | 32.1 | 11.7 | 283 | 47.2 | 50 | low |
| 2 | 4.43 | Yes | 3.21 | 31.1 | 12.1 | 277 | 37.2 | 48 | low |
| 3 | 3.87 | Yes | 5.28 | 33.2 | 9.4 | 290 | 35.3 | 48 | low |
| 4 | 6.75 | Yes | 3.66 | 35.6 | 10.2 | 280 | 41.3 | 50 | low |
| 5 | 5.89 | Yes | 3.08 | 33.4 | 10 | 274 | 42 | 52 | low |
| 6 | 5.89 | Yes | 3.08 | 34.5 | 11.2 | 269 | 39.7 | 47 | low |

TABLE 3

Materials and process conditions of Comparative Examples 1 to 3

| Comparative example | Fiber | Matrix | Angle θ [°] | Cut roller speed vc [°/s] |
|---|---|---|---|---|
| 1 | T700S-12K | epoxy | 90 | 275 RPM |
| 2 | T300-3K | epoxy | 90 | 275 RPM |
| 3 | T300-1K | epoxy | 90 | 275 RPM |

TABLE 4

Results of Comparative Examples 1 to 3

| Comparative Example | Average N [x1000] | satisfies $\frac{1.5 \times 10^5}{D^2} < N < \frac{4.5 \times 10^5}{D^2}$ | StDev [x1000] | Flexural modulus [GPa] | StDev [GPa] | Flexural strength [MPa] | StDev [MPa] | Vf [%] | cost |
|---|---|---|---|---|---|---|---|---|---|
| 1 | 12.00 | No | 0.79 | 23.8 | 6.4 | 205 | 80.3 | 50 | low |
| 2 | 2.97 | No | 0.80 | 33.1 | 12.1 | 279 | 42.2 | 50 | high |
| 3 | 0.98 | No | 0.31 | 36.4 | 10.3 | 285 | 39.4 | 50 | very high |

The invention claimed is:

1. A method of producing a random mat comprising fiber bundles, said fiber bundles comprising fibers, said method comprising:
   (i) cutting a fiber bundle at essentially constant intervals with a cutting roll having a rotational speed vc, wherein 100 RPM<$vc$<400 RPM, and a cutting edge has a diagonal angle θ with respect to the fibers direction; and
   (ii) reducing the size of the fiber bundle, thereby providing the random mat.

2. The method according to claim 1, wherein the fiber bundles comprise fibers having an average fiber length of 5 to 100 mm and has an average number N of fibers in the fiber bundle N that satisfies:

$$\frac{1.5 \times 10^5}{D^2} < N < \frac{4.5 \times 10^5}{D^2}$$

wherein D is the average diameter of fibers in the fiber bundle, expressed in micrometers, and the standard deviation $SD_N$ of the number of fibers in a fiber bundle satisfies:

1,000<$SD_N$<6,000 and at an end of the fiber bundle, the number of the fibers in a fiber bundle becomes less from center to edge of the fiber bundle in a fiber direction.

3. The method according to claim 1, wherein the fiber bundles satisfy:

2,000<$SD_N$<6,000.

4. The method according to claim 1, wherein the size of the fiber bundle is reduced by a stretching roll that is placed a distance L of 5 to 100 mm from a cutting roll, said cutting roll rotating at a rotational speed vc, said stretching roll rotating at a rotational speed vr; wherein vr is larger than vc.

5. The method according to claim 4, wherein the ratio of vr/vc satisfies:

20<$vr/vc$<80.

6. The method according to claim 4, wherein the roll is cylindrically or conically shaped.

7. The method according to claim 1, wherein 12K or 24K carbon fiber bundles are cut at step (i).

8. The method according to claim 1, wherein the mat is coated with a thermoset or thermoplastic polymer film or powder.

9. A composite material comprising the random mat according to the method defined in claim 1.

10. A molded fiber-reinforced article, wherein said molded fiber-reinforced article comprises one or more random mats according to claim 1, said molded fiber-reinforced article comprises 10 to 65% by mass of the fiber bundle with respect to the total mass of said fiber-reinforced article.

* * * * *